April 21, 1953 P. J. McCULLOUGH 2,635,312
CONNECTOR BOLT
Filed May 20, 1950

INVENTOR.
Paul J. McCullough
BY Rodney Bedell
Atty.

Patented Apr. 21, 1953

2,635,312

UNITED STATES PATENT OFFICE 2,635,312

CONNECTOR BOLT

Paul J. McCullough, St. Louis, Mo., assignor, by mesne assignments, to The Toastswell Company, Inc., St. Louis, Mo., a corporation of Missouri Application May 20, 1950, Serial No. 163,293

9 Claims. (Cl. 24—125)

The invention relates to connector bolts of the split shank type such as are commonly used for clamping together parallel electric wires.

Bolts of this type may not remain tight after installation but are likely to loosen up due to repeated pull and release on the wires, to changes in temperature, to working of the nut around the threads by the play and twisting of the wires or to a combination of these causes. These difficulties are due largely to the split structure of the bolt which permits the legs to yield transversely of the bolt away from the nut threads. In an effort to avoid such loosening, a workman often attempts to tighten the nut on the bolt by excessive thrust on the wrench and in so doing he may strip or rupture the threads so that the bolt is unreliable to a greater degree than would be under ordinary tightening or the bolt must be replaced, if the injury is promptly discovered.

The object of the present invention is to avoid the above-mentioned difficulties and this object is accomplished by providing structure which will press the bolt legs outwardly against the threads of the nut as the nut is tightened to clamp the wires together.

The invention lies primarily in the construction of the washer positioned between the nut and the wires clamped by the bolt, the washer being made in two parts adapted to move relative to each other as the nut is tightened and having opposing triangular sections moving over each other to wedge the parts transversely of the bolt to effect the desired result.

The invention will be better understood by the following detailed description, reference being had to the accompanying drawings, in which.

The bolt includes a head 1 and a shank split longitudinally to form spaced legs 2 threaded for the application of the usual nut 3.

Figure 5:
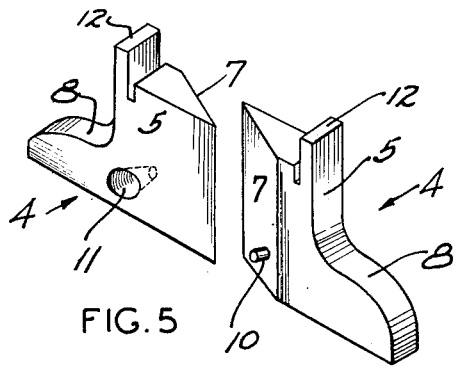
Figure 5 is a perspective of the washer parts separated from each other.

The washer comprises two L-shaped parts 4, as detailed in Figure 5, the upright arm 5 of each part being positioned between the bolt legs and the horizontal arm 6 of each part projecting laterally from the bolt shank. As viewed from above, the washer has an elongated rectangular contour bisected by a diagonal line defining diagonal end faces 7 of upright arms 5 so that each arm has a wedge-like section in a plane extending transversely of the bolt axis.

The horizontal arm 6 of each part has an upwardly facing nut seating surface 8 inclined outwardly and downwardly from arm 5 and has a downwardly facing wire opposing surface 9, also inclined outwardly and downwardly from arm 5.

It is preferred to maintain the two parts 4 assembled before being applied to the nut, and accordingly one of the parts is provided with a projecting lug 10 and the other is provided with a tapered hole 11, adapted to receive lug 10 and the end of the latter is spread after insertion in the hole to hold the parts together or, if desired, the two parts may be drilled to receive a pivot pin extending through them transversely of arms 6.

Figure 1:
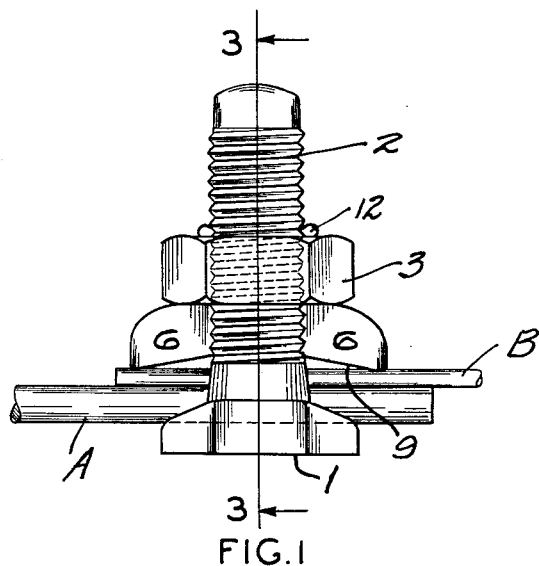
Figure 1 is a side view of a bolt embodying the invention and clamping two wires together.
Figure 3:
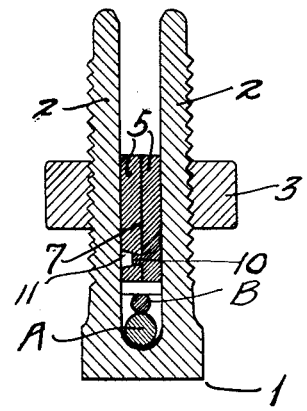
Figure 3 is a vertical section through the bolt taken on the line 3—3 of Figure 1.

At the upper end of each arm 5 is a tongue 12 as is usually provided on connector bolt washers to be bent over the top of the nut as shown in Figure 1 to maintain assembly of the nut and washer, irrespective of their application to or position on the bolt shank.

Figure 2:
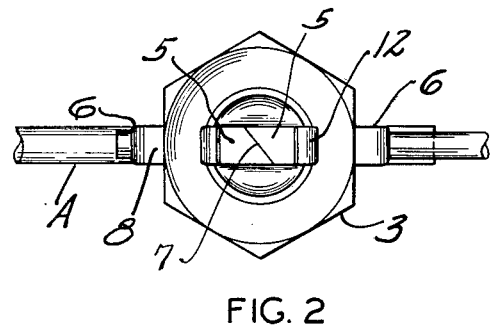
Figure 2 is a top view of the assembly shown in Figure 1.
Figure 4:
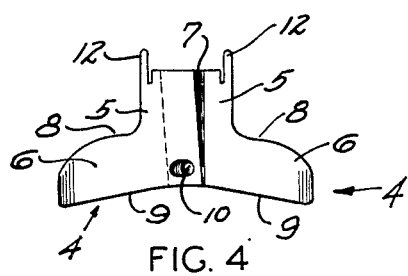
Figure 4 is a side view of the two part washer.

When a pair of wires A and B are to be clamped together and are placed between legs 2, the nut and washer are rotated freely on to the bolt shank until the ends of arms 6 contact the upper wire B, whereupon parts 4 rock about their pivot connection 10 due to the downward pressure on seats 8 and the support of the washer near the ends of arms 6, which is spaced further apart than the nut seats 8. This rocking of parts 4 causes the upper portions of arms 5 to move towards each other from the position indicated in Figure 4 to that shown in Figures 1 and 2 and during such movement their wedge-like sections causes the parts to press against legs 2 transversely of the bolt and thrusts the threads of the shank tightly against the threads of the nut. The tighter the nut is turned, the greater the lateral thrust.

For the purpose of more clearly explaining the structure, some of the elements are shown exaggerated such as, for example, the inclination of surfaces 8 and 9 and the angularity of the wedge-shaped sections, but these and other details may be varied substantially without departing from the spirit of the invention and the exclusive use of those modifications coming within the scope of the claims is contemplated.

What is claimed is:

1. In an electric wire connector, a bolt having a head and a split shank extending therefrom and forming spaced legs, a nut threaded thereon, a washer between said legs and having surfaces facing towards the bolt head and inclined from the bolt axis outwardly and towards the head, said washer having surfaces facing away from the bolt head and inclined outwardly and towards the bolt head and forming a seat for said nut, said washer comprising two parts each having a wedge-like section in a plane extending transversely of the shank axis.

2. In an electric wire connector, a bolt having a head and a split shank extending therefrom and forming spaced legs, a nut threaded thereon and a wire engaging elongated washer between the nut and the head extending between said legs transversely of the bolt beyond the shank and having a head-facing surface concave from end to end, said washer comprising two units pivoted to each other by a horizontal pivot extending transversely of the length of the washer near the axis of the bolt, said units having parts projecting laterally from the shank with nut-facing surfaces inclined outwardly from said shank towards said head, said parts being wedge-like in section transversely of the shank and having a sliding bearing on each other.

3. In an electric wire connector, a bolt having a head and a split shank extending therefrom and forming spaced legs, a nut threaded onto said legs, a washer extending through said shank between and beyond said legs and comprising two upright parts having opposing surfaces inclined to the diameter of the shank, and each part having a nut seat surface and a head opposing surface extending beyond said shank and inclined to the bolt axis, the highest points on the head opposing surfaces being spaced apart a greater distance than the highest points on the nut opposing surfaces, and a pivot between said parts extending transversely of the shank axis.

4. A connector bolt washer comprising two parts cooperating to form a nut seat facing in one direction and spaced wire engaging elements facing in the opposite direction, said parts having wedge-like sections transversely of the axis of the washer allowing relative movement between the parts, the wire engaging elements having end portions in one plane and an intermediate portion spaced from the plane toward the nut seat so that upon opposite pressure being applied to the nut seat and wire engaging elements the wedge-like sections are caused to move relative to each other, and means holding said parts movably assembled.

5. A connector bolt washer which, as viewed from above, comprises a long, narrow rectangle split diagonally to form two triangular sections, an arm projecting laterally from the lower portion of each section and forming an upwardly facing nut seat surface and a downwardly facing wire engaging surface, each of said surfaces being inclined outwardly and downwardly from the center of the washer, and means holding said parts movably assembled.

6. A connector bolt washer comprising two L-shaped units assembled back to back, the horizontal arms of said units having upwardly and downwardly facing surfaces inclined downwardly away from the upright arms, the upright arms having opposed surfaces lying in a vertical plane extending diagonally of the horizontal arms, and means holding said parts movably assembled.

7. A connector bolt washer as described in claim 6 in which the means holding the units assembled comprises a rivet-like element extending transversely of the lower portions of the upright arms and loosely received in at least one of the units.

8. A connector bolt washer as described in claim 5 in which the highest points on the wire engaging surface are spaced apart a greater distance than the highest points on the nut seat surface.

9. In an electric wire connector, a bolt having a head and a split shank extending therefrom, a nut threaded thereon, a washer extending through the shank between the head and the nut and comprising two parts, each part having end portions extending toward the head and an intermediate portion spaced a greater distance from the head than the end portions and each part having opposing diagonal surfaces within the shank and facing transversely of the shank axis.

PAUL J. McCULLOUGH.

References Cited in the file of this patent

UNITED STATES PATENTS

| Number | Name | Date |
|---|---|---|
| 1,206,044 | Smart | Nov. 28, 1916 |
| 1,258,707 | Rice | Mar. 12, 1918 |

FOREIGN PATENTS

| Number | Country | Date |
|---|---|---|
| 640,267 | Germany | Dec. 28, 1936 |